(12) United States Patent
Komuro et al.

(10) Patent No.: US 6,251,297 B1
(45) Date of Patent: Jun. 26, 2001

(54) METHOD OF MANUFACTURING POLARIZING PLATE

(75) Inventors: Eiju Komuro, Milton Keynes (GB); Tohru Kineri, Chiba (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/207,659

(22) Filed: Dec. 9, 1998

(30) Foreign Application Priority Data

Dec. 22, 1997 (JP) .................................................. 9-365645

(51) Int. Cl.$^7$ ............................... G02B 5/30; G02F 1/133
(52) U.S. Cl. .................... 216/24; 216/40; 216/44; 216/52
(58) Field of Search ............................. 216/24, 40, 44, 216/52, 67, 75, 77

(56) References Cited

U.S. PATENT DOCUMENTS

| | | | |
|---|---|---|---|
| 4,304,584 | 12/1981 | Borrelli et al. | 65/30.11 |
| 5,676,854 | * 10/1997 | Inui et al. | 216/24 |
| 5,772,905 | * 6/1998 | Chou | 216/44 |
| 5,817,242 | * 10/1998 | Biebuyck et al. | 216/24 |
| 5,925,259 | * 7/1999 | Biebuyck et al. | 216/2 |
| 5,943,156 | * 8/1999 | Komuro et al. | 359/280 |

FOREIGN PATENT DOCUMENTS

| | | |
|---|---|---|
| 56-169140 | 12/1981 | (JP) . |
| 58-042003 | * 3/1983 | (JP) . |
| 7-294730 | 11/1995 | (JP) . |

* cited by examiner

Primary Examiner—Anita Alanko
(74) Attorney, Agent, or Firm—Oblon, Spivak, McClelland, Maier & Neustadt, P.C.

(57) ABSTRACT

A method of manufacturing a polarizing plate of a resonance absorption effect type wherein plural bar-like polarizing members are arranged in a light-transmittable polarizing matrix layer with major axes thereof orienting in a constant direction. The method includes a preparing process of a forming die for preparing a forming die having a concavoconvex pattern corresponding to a layout pattern of the bar-like polarizing members, a forming process of a concavoconvex pattern on a resin layer for forming a resin layer directly or indirectly on a substrate and pressing the forming die onto the resin layer so as to form a concavoconvex pattern on the resin layer, a forming process of bar-like polarizing members for forming the bar-like polarizing members in the foregoing layout pattern using the concavoconvex pattern of the resin layer, and a forming process of a polarizing matrix layer for forming the light-transmittable polarizing matrix layer so as to bury the formed bar-like polarizing members. Accordingly, the polarizing plate of the resonance absorption effect type can be obtained, which is low in price, massproducible, high in extinction ratio, high in performance and high in reliability.

10 Claims, 5 Drawing Sheets

PRIOR ART

METHOD OF MANUFACTURING POLARIZING PLATE

BACKGROUND OF THE INVENTION

1. Field of the Invention

The present invention relates to a polarizing plate for use in optical communication, optical recording, sensor or the like and, in particular, to a polarizing plate of a resonance absorption effect type which generates the optical anisotropy by dispersing and arranging metal like islands in a dielectric substance or on the surface of the dielectric substance and which is highly reliable and massproducible at a low price in view of manufacturing processes.

2. Description of the Prior Art

As a linear polarizing plate heretofore used in a liquid crystal display or the like, a linear polarizing film using iodine or dye with a resin film as a base is well known. In the film, by stretching the base film, dichroic materials of iodine or dye are oriented to obtain a polarizing property.

JP-A-56-169140 proposes a method of manufacturing a polarizing plate, wherein a metallic compound, such as silver halide, is dispersed into glass which is then heated and stretched so as to deform fine silver halide particles into spheroidal shapes and orient them so that a stretching direction and major axis directions of the spheroidal shapes coincide with each other, and then the silver halide particles on the surface of the glass are subjected to a reduction process. The polarizing plate obtained by the proposed manufacturing method has a less loss than the polarizing plate using the foregoing resin film, and further has a higher durability, and thus has been widely used in the field of optical communication.

Figure 5:
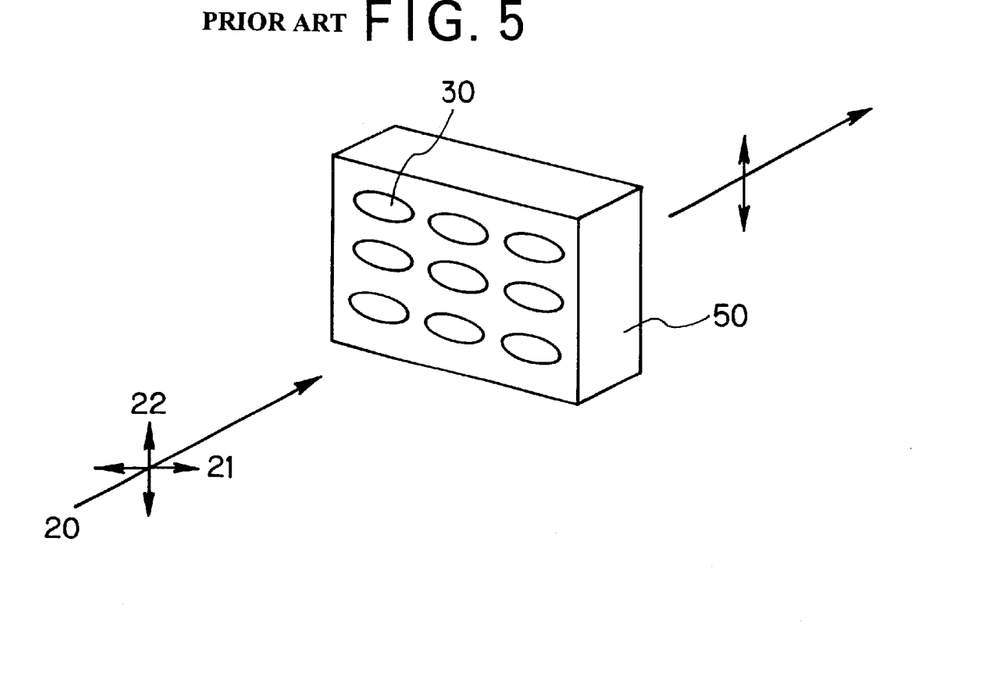
FIG. 5 is a schematic perspective view of a polarizing plate of a resonance absorption effect type.

The polarizing plate of the type wherein such bar-like metallic polarizing particles are oriented in a glass matrix or the like exerts its polarizing effect using a so-called resonance absorption effect. The principle of the generating the polarization is as shown in FIG. 5. Specifically, incident light 20 can be resolved into two components 21 and 22 which are perpendicular to each other. In a polarizing glass 50 shown in FIG. 5, the component 21 having a vibration component in the same direction of a major axis of a metallic polarizing particle 30 is absorbed, while the component 22 having a vibration component in the same direction of a minor axis of the metallic polarizing particle 30 is transmitted through the polarizing glass so that a polarizing property is generated. However, the technique proposed in the foregoing JP-A-56-69140 requires a number of processes, such as melting of glass, thermal treatment, stretching, grinding/polishing, reduction and burning. Further, each process is remarkably complicated. Moreover, it is considered difficult to equalize the size of the silver halide particles during heating and stretching the glass. Therefore, in view of the manufacturing processes, it is extremely difficult to supply a polarizing glass having a large area.

Figure 6:
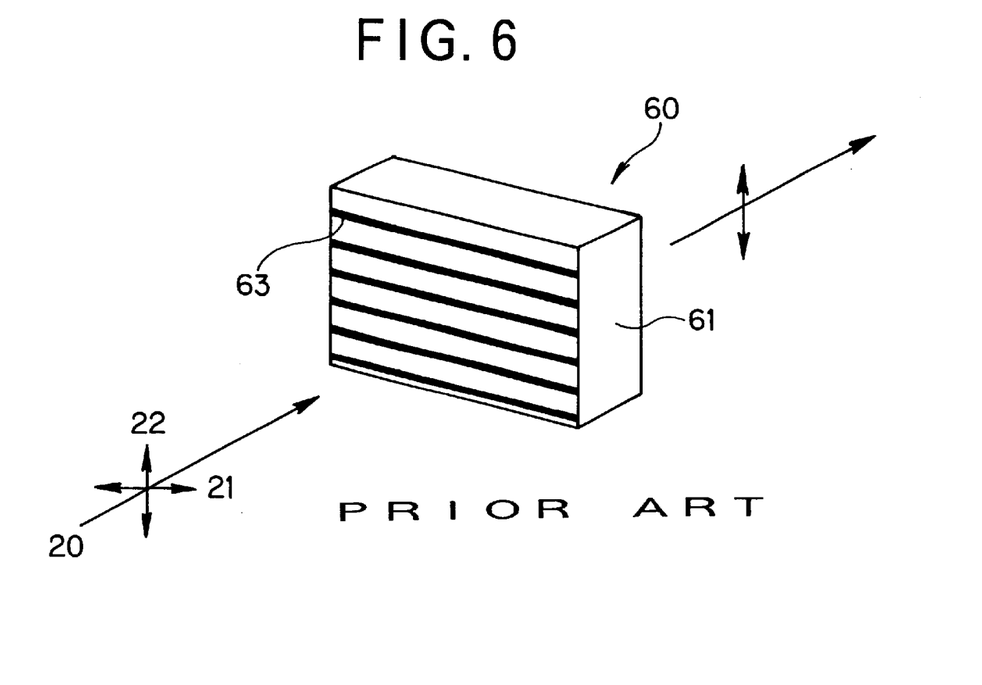
FIG. 6 is a schematic perspective view of a grid type polarizing plate.

On the other hand, there is a grid type polarizing plate which totally differs in structure and operation from the polarizing plate to which the present invention is directed. As shown in FIG. 6, a grid type polarizing plate 60 comprises a dielectric substrate 61 and plural metallic fine lines 63 formed into a grid and provided on the dielectric substrate 61. The polarizing plate 60 reflects polarizing components parallel to the metallic fine lines 63, while transmits therethrough components perpendicular to the metallic fine lines so as to obtain a polarizing property in an infrared region. In the grid type polarizing plate 60, a pitch of the grid should be no greater than ½ of a wavelength for avoiding diffraction of the light, and it is preferable that a width of each of the metallic fine lines 63 is as small as possible for decreasing absorption of polarizing components in a direction of the transmission.

In view of massproductivity of such grid type polarizing plates, JP-A-7-294730 proposes a technique wherein a number of replicas are produced by an injection molding or 2P method, using a stamper having a stripe pattern with a sawtooth-shaped cross section view, and then through oblique deposition, metallic thin films, which become grid fine lines, are formed on essentially vertical sawtooth walls. As described above, in the grid type polarizing plate, the formation of the extremely thin metallic fine lines as well as the high accuracy of the grid pitch, i.e. a line width control of several nanometers, are required. However, it is extremely difficult to form the metallic thin films uniformly on the respective walls by means of oblique deposition. If unevenness occurs in thickness of the metallic thin films, the grid line widths and the grid pitches do not become uniform so that a polarizing property is adversely affected. Further, a manufacturing operation for a stamper of a very special shape is also required.

SUMMARY OF THE INVENTION

Therefore, it is an object of the present invention to provide a method of manufacturing a polarizing plate of a resonance absorption effect type which is low in price, massproducible, high in extinction ratio, high in performance and high in reliability.

According to one aspect of the present invention, there is provided a method of manufacturing a polarizing plate of a resonance absorption effect type wherein plural bar-like polarizing members are arranged in a light-transmittable polarizing matrix layer with major axes thereof orienting in a constant direction, the method comprising (1) a preparing process of a forming die for preparing a forming die having a concavoconvex pattern corresponding to a layout pattern of the bar-like polarizing members; (2) a forming process of concavoconvex pattern on a resin layer for forming a resin layer directly or indirectly on a substrate and pressing the forming die onto the resin layer so as to form a concavoconvex pattern on the resin layer; (3) a forming process of bar-like polarizing members for forming the bar-like polarizing members in the layout pattern using the concavoconvex pattern of the resin layer; and (4) a forming process of a polarizing matrix layer for forming the light-transmittable polarizing matrix layer so as to bury the formed bar-like polarizing members.

According to another aspect of the present invention, there is provided a method of manufacturing a polarizing plate of a resonance absorption effect type wherein plural bar-like polarizing members are arranged in a light-transmittable polarizing matrix layer with major axes thereof orienting in a constant direction, the method comprising (1) a preparing process of a forming die for preparing a forming die having a concavoconvex pattern corresponding to a layout pattern of the bar-like polarizing members; (2) a forming process of concavoconvex pattern on a resin layer for forming a resin layer directly or indirectly on a substrate and pressing the forming die onto the resin layer so as to form a concavoconvex pattern on the resin layer; (3) a forming process of bar-like polarizing members for forming the bar-like polarizing members in the layout pattern using the concavoconvex pattern of the resin layer; and (4) a forming process of a polarizing matrix layer for forming the light-transmittable polarizing matrix layer so as to bury the formed bar-like polarizing members, wherein the processes (2) to (4) are repeated using the formed polarizing matrix layer as the substrate so as to stack the polarizing matrix layers each including the bar-like polarizing members It may be arranged that, in the forming process of concavoconvex pattern on the resin layer (2), the resin layer is formed directly on the substrate, and that, in the forming process of the bar-like polarizing members (3), the resin layer is etched according to the concavoconvex pattern of the resin layer to expose the substrate, then the bar-like polarizing members are deposited on the exposed substrate, and then the remaining resin layer is removed.

It may be arranged that, in the forming process of concavoconvex pattern on the resin layer (2), a conductive material for forming the bar-like polarizing members is interposed between the substrate and the resin layer, and that, in the forming process of the bar-like polarizing members (3), the resin layer and the conductive material are etched according to the concavoconvex pattern of the resin layer, and then the remaining resin layer is removed.

It may be arranged that, in the forming process of concavoconvex pattern on the resin layer (2), the resin layer is softened prior to pressing the forming die onto the resin layer.

It may be arranged that each of the bar-like polarizing members is made of silver.

It may be arranged that a length of the major axis of each of the bar-like polarizing members is set to no greater than a wavelength of an incident light to the polarizing plate.

DESCRIPTION OF THE PREFERRED EMBODIMENT

Now, preferred embodiments of the present invention will be described hereinbelow with reference to the accompanying drawings.

Figure 3:
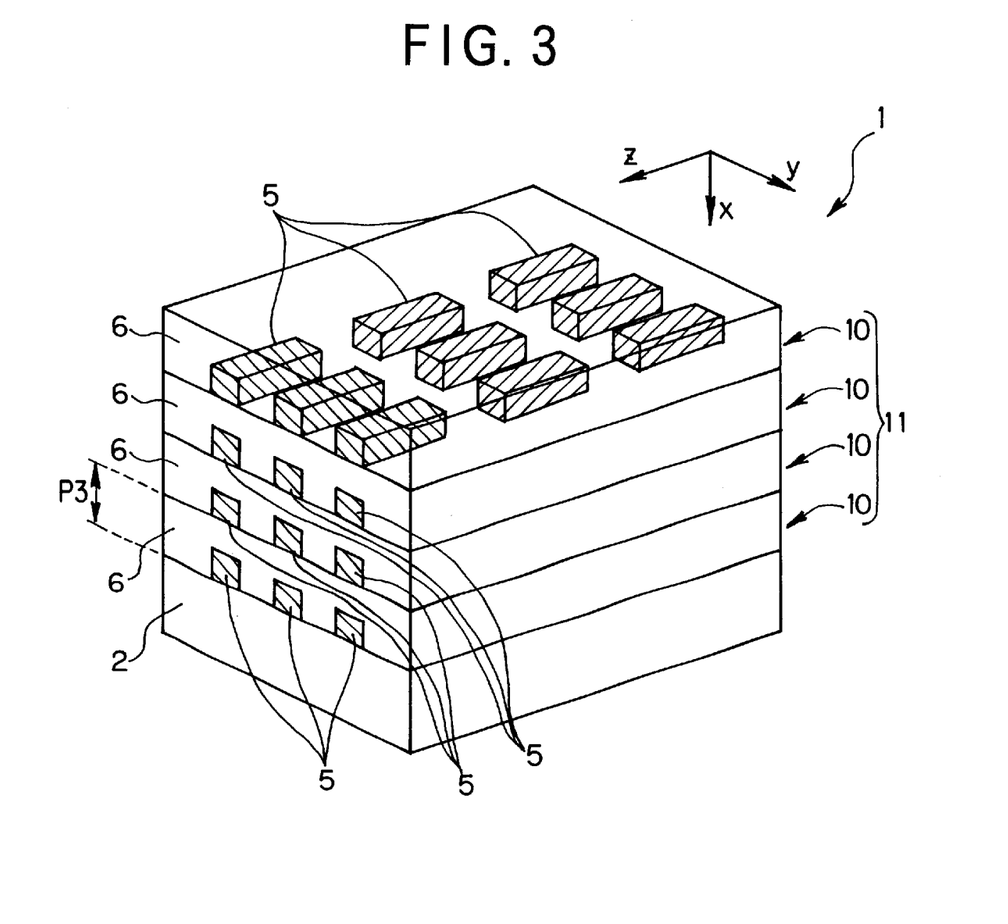
FIG. 3 is a schematic perspective view of a polarizing plate having plural monolayer polarizing layers.

As shown in FIG. 3, a polarizing plate 1 to be manufactured in the preferred embodiments of the present invention is of a resonance absorption effect type wherein plural bar-like polarizing members 5 are arranged in light-transmittable polarizing matrix layers 6 so as to orient their major axes in a constant direction. In the polarizing plate 1 of the resonance absorption effect type, a length of the major axis of each bar-like polarizing member 5 is normally set to no greater than a wavelength λ of an incident light on the polarizing plate 1. If the major axis length of the bar-like polarizing member 5 is longer than the wavelength λ, the polarizing property is reluctant to occur. In general, the lower limit of the major axis length of the bar-like polarizing member 5 is about 10 nm. In case of no greater than 10 nm, the limitation of the mean free path to free electron broadens the resonance peak, which is not preferable. The aspect ratio of the bar-like polarizing member 5 is normally set to about from 1.5:1 to 40:1, and the fraction of the barlike polarizing members 5 contained in the polarizing matrix layer 6 is normally set to about from 0.01wt % to several wt %. The aspect ratio is defined by a ratio of a length of the major axis to a length of the minor axis. As the typical shape of the bar-like polarizing member 5, a rectangular parallelepiped, a spheroid or the like can be exemplified.

A polarizing plate manufacturing method according to the first preferred embodiment of the present invention will be described hereinbelow with reference of (A) to (F) in FIG. 1.

(1) Preparing Process Of Forming Die

First, a forming die 4 as shown at (B) in FIG. 1 is prepared. As shown, the forming die 4 has a concavoconvex pattern 41 corresponding to a layout pattern of bar-like polarizing members.

There is no particular limitation to a material of the forming die 4, and metal, dielectric, semiconductor or the like may be used therefor. For the formation of the concavoconvex pattern 41 on the surface of the forming die 4, an EB(Electron Beam) drawing apparatus which can form a fine pattern with high accuracy can be used. For forming a pattern of a large area, a concavoconvex pattern forming operation using the EB drawing apparatus takes much time. However, once the forming die 4 is produced, it can be used as many times as possible and is thus suitable for massproduction.

(2) Forming Process Of Concavoconvex Pattern On Resin Layer

Figure 1A:
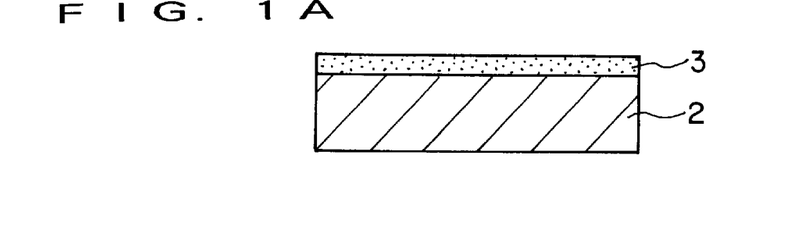
FIG. 1 is a schematic sectional view showing a polarizing plate manufacturing method according to a first preferred embodiment of the present invention, wherein the method is shown with a lapse of time from (A) to (F).

As shown at in FIG. 1(A), a resin layer 3 is directly formed on a substrate 2. In this embodiment, thermoplastic polymer is used as a preferable material of the resin layer 3. As a method of the formation, a coating method such as spin coating, or a vacuum film forming method such as vapor deposition is used. The thickness of the resin layer 3 is normally set to about from 30 to 500 nm.

Figure 1B:
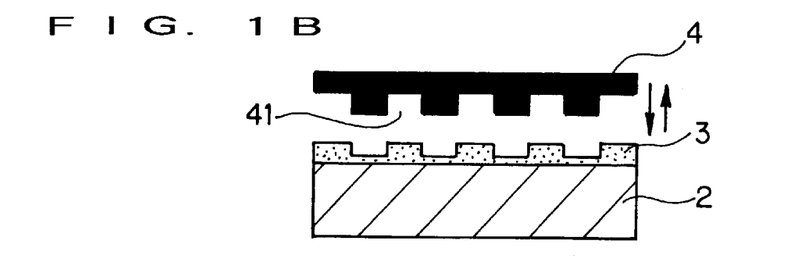
Figure 1C:
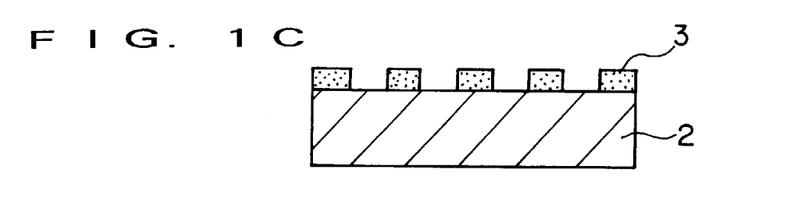
Figure 1D:
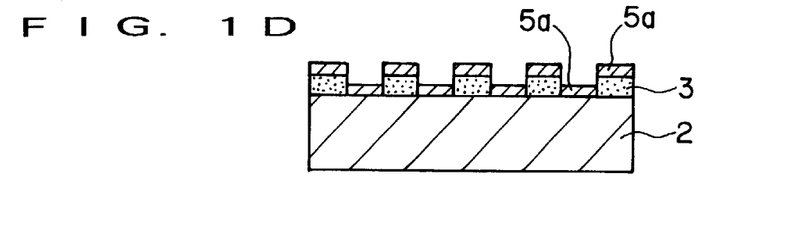
Figure 1E:
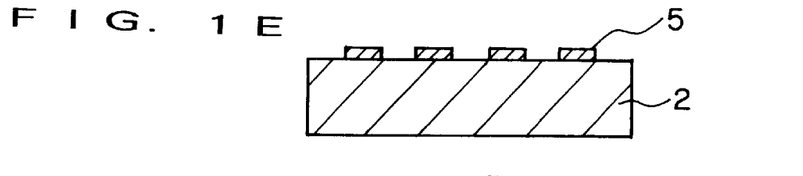
Figure 1F:
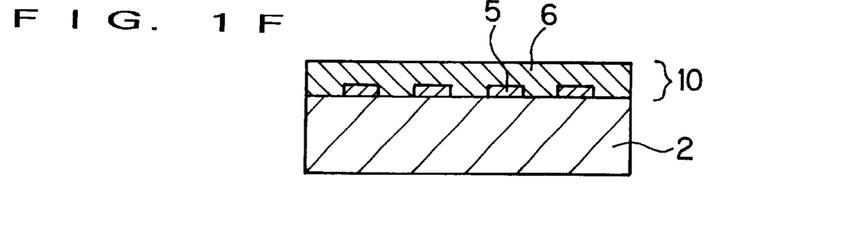

Then, the forming die 4 prepared in advance, the resin layer (thermoplastic polymer) 3 and the substrate 2 are heated and, when the thermoplastic polymer is fluidized to some extent, the forming die 4 is pressed onto the resin layer 3. After lowering the temperature, the forming die 4 pressed onto the surface of the resin layer 3 is separated from the resin layer 3 so that the surface configuration (concavoconvex pattern) of the forming die 4 is transcribed on the resin layer 3 (see (B) in FIG. 1).

The thermoplastic polymer used as the preferable material of the resin layer 3 is selected so as to be soft and fluidized during being heated so that the concavoconvex pattern on the surface of the forming die 4 is reliably transcribed when the forming die 4 is pressed thereupon.

(3) Forming Process Of Bar-Like Polarizing Member

Thereafter, the whole surface of the resin layer 3 is etched using a dry etching method to render the thickness of the resin layer 3 at concave portions thereof zero so that the surface of the substrate 2 is exposed along the given pattern shape (see (C) in FIG. 1). As the dry etching method, a reactive ion etching method is preferable to be used, but any of other dry etching methods may also be used. On the substrate 2, films of a conductive material 5a, which will be bar-like polarizing members 5, are formed using a vacuum sputtering method, a vacuum vapor deposition method or the like (see (D) in FIG. 1). Then, using a solvent, the resin layer 3 remaining on the substrate 2 is dissolved so as to remove the excessive conductive material 5a on the resin layer 3 as well as the resin layer 3 (see (E) in FIG. 1).

As the conductive material 5a of the bar-like polarizing members 5, a highly conductive metallic material, such as gold, silver or aluminum, is used. among them, it is particularly preferable to use silver.

There is no particular limitation for a solvent to be used for dissolving the resin layer 3, and any of solvents which dissolve the thermoplastic polymer but do not corrode the substrate 2 and the conductive material Sa may be used therefor.

(4) Forming Process Of Polarizing Matrix Layer

Then, a light-transmittable polarizing matrix layer 6 is formed using a vacuum sputtering method, a vacuum vapor deposition method or the like so as to bury the thus formed bar-like polarizing members 5. As the polarizing matrix layer 6, light-transmittable glass, ceramic or the like is preferably used, but there is no particular limitation thereto. In the foregoing manner, one layer of the polarizing layer (monolayer polarizing layer 10) is completed (see (F) in FIG. 1). Since it may be considered that a sufficient polarizing property can not be achieved with only one layer, plural monolayer polarizing layers 10 are stacked by repeating the foregoing processes represented by (A) to (F) in FIG. 1 so as to produce a polarizing layer 11 as shown in FIG. 3. The number of the layers to be stacked is properly determined based on the kind of the bar-like polarizing member 5 (conductive material 5a), the pattern shape of the forming die 4, the required transmittance, the extinction ratio and so forth.

In the foregoing method using the forming die 4, since the bar-like polarizing members 5 are formed through the transcription of the concavoconvex pattern 41 of the forming die 4, the aspect ratios thereof are highly uniform. Further, the dispersion degrees of the bar-like polarizing members 5 in the polarizing matrix layer 6 can also be highly uniform. Moreover, depending on the formation of the concavoconvex pattern 41 of the forming die 4, the aspect ratio distribution of the bar-like polarizing members 5 can be set to a given range so that polarizing effect can be obtained in a wide wavelength region.

A polarizing plate manufacturing method according to the second preferred embodiment of the present invention will be described hereinbelow with reference of (A) to (E) in FIG. 2.

(1) Preparing Process Of Forming Die

Since this process is the same as that of the first preferred embodiment shown in FIG. 1, explanation thereof is omitted.

(2) Forming Process Of Concavoconvex Pattern On Resin Layer

As shown at (A) in FIG. 2, a film of a conductive material 5a, which will be bar-like polarizing members 5, is formed on a substrate 2 using a vacuum sputtering method, a vacuum vapor deposition method or the like, then a resin layer 3 is formed on the conductive material 5a. In this embodiment, thermoplastic polymer is used as a preferable material of the resin layer 3. As a method of the formation, a coating method such as spin coating, or a vacuum film forming method such as vapor deposition is used.

Figure 2A:
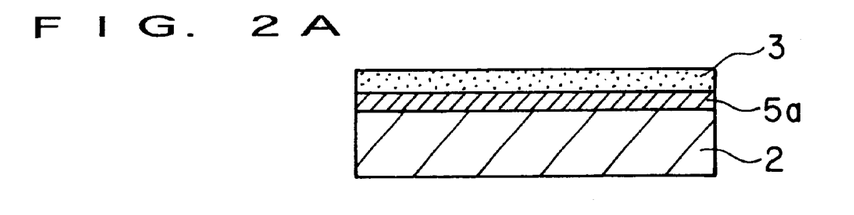
FIG. 2 is a schematic sectional view showing a polarizing plate manufacturing method according to a second preferred embodiment of the present invention, wherein the method is shown with a lapse of time from (A) to (E).
Figure 2B:
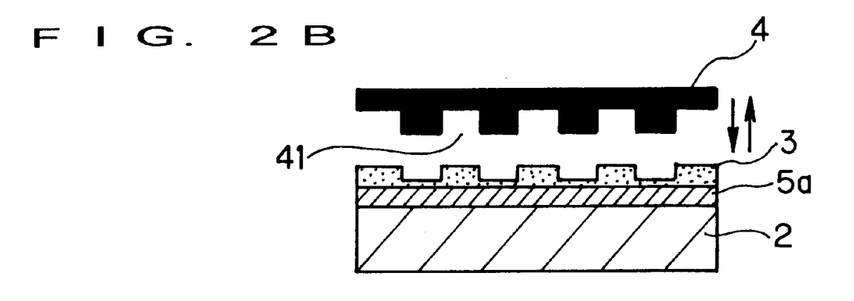
Figure 2C:
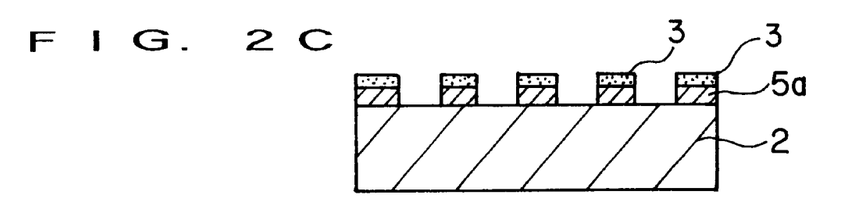
Figure 2D:
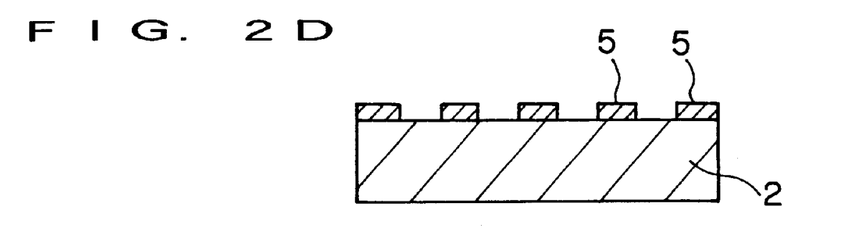
Figure 2E:
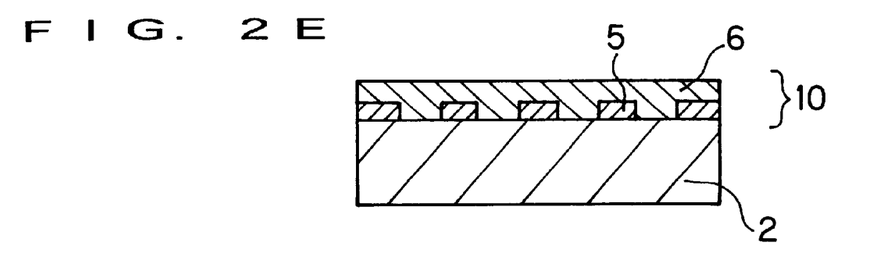

Then, the forming die 4 prepared in advance, the resin layer (thermoplastic polymer) 3, the conductive material 5a and the substrate 2 are heated and, when the thermoplastic polymer is fluidized to some extent, the forming die 4 is pressed onto the resin layer 3. After lowering the temperature, the forming die 4 pressed onto the surface of the resin layer 3 is separated from the resin layer 3 so that the surface configuration (concavoconvex pattern) of the forming die 4 is transcribed on the resin layer 3 (see (B) in FIG. 2).

(3) Forming Process Of Bar-Like Polarizing Member

Thereafter, the surface of the concavoconvex pattern is etched using a dry etching method to completely remove the resin layer 3 and the conductive material 5a at portions where concave portions of the concavoconvex pattern are located (the dry etching of the resin layer 3 and the conductive material 5a is normally carried out under their own etching conditions, respectively), so that the surface of the substrate at the corresponding portions is exposed (see (C) in FIG. 2). Then, using a solvent, the thermoplastic polymer 3 remaining on the conductive material 5a is completely removed (see (D) in FIG. 2).

(4) Forming Process of Polarizing Matrix Layer

Then, a light-transmittable polarizing matrix layer 6 is formed using a vacuum sputtering method, a vacuum vapor deposition method or the like so as to bury the thus formed bar-like polarizing members 5. In the foregoing manner, one layer of the polarizing layer (monolayer polarizing layer 10) is completed (see (E) in FIG. 2). Since it may be considered that a sufficient polarizing property can not be achieved with only one layer, plural monolayer polarizing layers 10 are stacked by repeating the foregoing processes represented by (A) to (E) in FIG. 2 so as to produce the polarizing layer 11 as shown in FIG. 3. As described before, the number of the layers to be stacked is properly determined based on the kind of the bar-like polarizing member 5 (conductive material 5a), the pattern shape of the forming die 4, the required transmittance, the extinction ratio and so forth.

As shown in FIG. 3, directions of major axes of the bar-like polarizing members 5 contained in the polarizing layer 11 are uniform. An operation of the polarizing layer 11 will be briefly explained with reference of FIG. 3. In FIG. 3, when the light enters along an x-axis direction, the light vibrating in the same direction of the major axis (z-axis direction) of the bar-like polarizing members 5 is absorbed while passing the polarizing layer 11, on the other hand, the light vibrating in a direction (y-axis direction) perpendicular thereto is hardly absorbed while passing the polarizing layer 11. In this event, a ratio of the intensity of the light not absorbed relative to the intensity of the light absorbed is called an extinction ratio and, as the extinction ratio increases, the degree of the linear polarization of the light having passed the polarizing layer 11 increases.

EXAMPLE

Figure 4A:
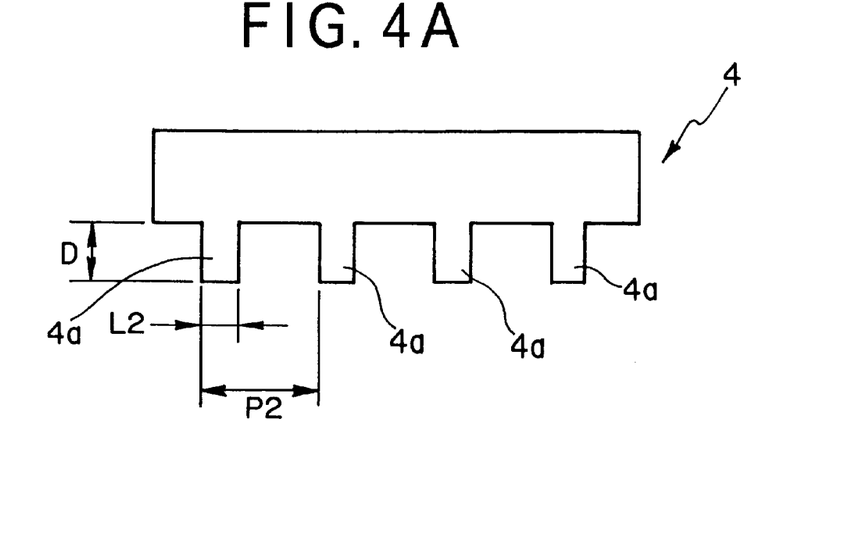
FIG. 4 is a diagram for explaining a forming die, wherein (A) is a schematic plan view of the forming die, and (B) is a schematic front view of the forming die.
Figure 4B:
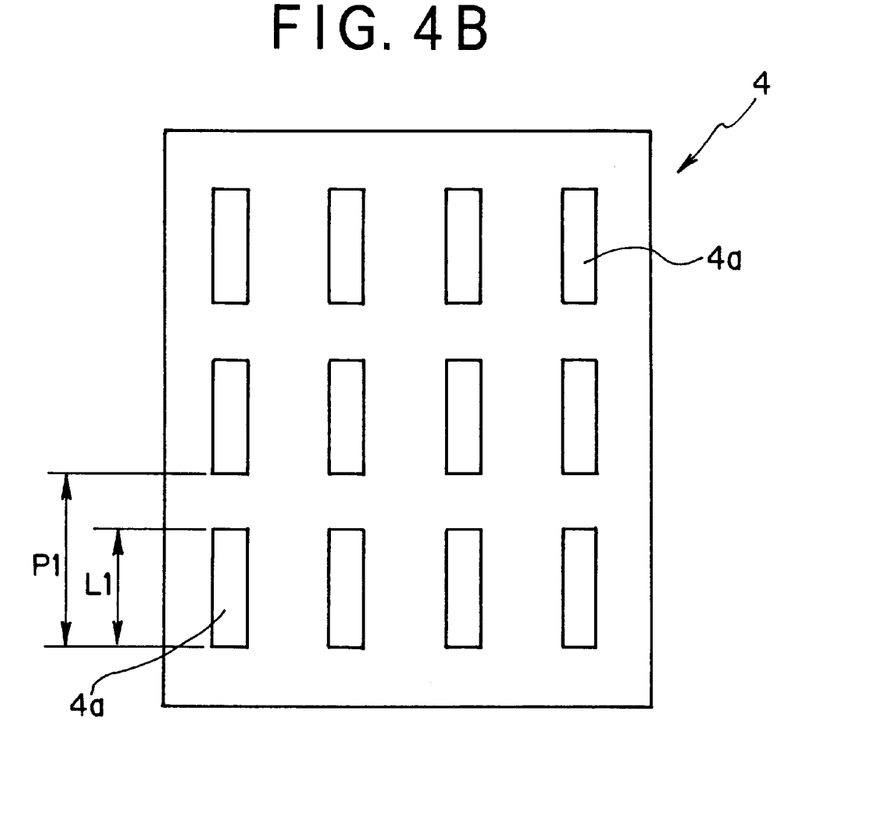

Now, concrete examples will be shown to explain the present invention in further detail. Preparation of Polarizing Plate Sample In this example, a polarizing plate was produced according to the processes shown in FIG. 1. A forming die 4 was made of silicon dioxide ($SiO_2$) as a base material, and a concavoconvex pattern as shown in FIG. 4 was formed on the surface of the forming die 4 using an electron beam drawing method. In FIG. 4, (A) is a plan view of the forming die 4 and (B) is a front view of the forming die 4.

In FIG. 4, dimensions of each of convex portions 4a of the forming die 4 were such that $L1=300$ nm, $L2=25$ nm and D (height) $=80$ nm, and further, $P1=P2=1000$ nm. The size of the whole forming die 4 was set to 2cm ×2cm. Accordingly, the number of the convex portions 4a shown in FIG. 4 is only for convenience of explanation and differs from the actual number thereof.

Using the foregoing forming die 4, the polarizing plate was produced in the following manner:

First, a resin layer 3 of thermoplastic polymer having a thickness of about 100 nm was formed on an aluminosilicate glass substrate 2 using a spin coating method. As the thermoplastic polymer, polymethylmethacrylate (PMMA) was used.

Then, after heating the forming die 4 and the substrate 2 on which the resin layer 3 was formed, up to 180° C., the forming die 4 was pressed onto the resin layer 3. While the forming die 4 was pressed onto the resin layer 3, the temperature was lowered to a room temperature. Then, the forming die 4 was separated from the resin layer 3 so that the concavoconvex pattern of the forming die 4 was transcribed onto the surface of the resin layer 3.

Thereafter, the surface of the resin layer 3 was etched using a reactive ion etching method introducing oxygen so as to render the thickness of the resin layer 3 at the concave portions thereof zero so that the surface of the substrate 2 at the corresponding portions was exposed.

Subsequently, a conductive material 5a was formed on the substrate 2 using a vacuum sputtering method. In this example, the conductive material 5a was silver and had a thickness of about 30nm. Then, using acetone, the resin layer 3 remaining on the substrate 2 and the conductive material 5a formed thereon were removed during a so-called lift-off process. As a result of observation, using an electron microscope, of bar-like polarizing members 5 (conductive material 5a) remaining on the substrate 2, it was confirmed that silver of the approximately same dimensions as the surface pattern of the forming die 4 was formed.

Thereafter, a light-transmittable polarizing matrix layer 6 was formed using a vacuum sputtering method. As the polarizing matrix layer 6, aluminosilicate glass was used and its thickness P3 (see FIG. 3) was about 1000 nm. In this fashion, one layer of the polarizing layer (monolayer polarizing layer 10) was produced. In this example, the polarizing layer 11 was produced by stacking fifteen layers of monolayer polarizing layer 10.

Evaluation of Polarizing Plate Sample

With respect to the polarizing plate sample thus produced, the extinction ratio was measured using a laser beam source with a wavelength of 850nm, and a high extinction ratio of 33 dB was obtained. As a result of measurement of the transmittance using the same laser beam source, the transmittance of the light passing the polarizing layer was 80%, wherein the plane of polarization of the light irradiated from the laser source was consistent with a transmission axis (y axis in FIG. 3) of the polarizing layer 11.

Further, a sample having only one monolayer polarizing layer 10 was prepared according to the foregoing manufacturing method, and the extinction ratio and the transmittance were measured with respect to this sample. As a result, the extinction ratio was 2 dB and the transmittance was 97%. From the results, it was confirmed that the greater extinction ratio could be accomplished by stacking the monolayer polarizing layers 10 to some proper degree.

From the foregoing results, the effects of the present invention are made clear. Specifically, according to the present invention, there is provided a method of manufacturing a polarizing plate of a resonance absorption effect type wherein plural bar-like polarizing members are arranged in a light-transmittable polarizing matrix layer with major axes thereof orienting in a constant direction, the method comprising a preparing process of a forming die for preparing a forming die having a concavoconvex pattern corresponding to a layout pattern of the bar-like polarizing members, a forming process of the concavoconvex pattern on a resin layer for forming a resin layer directly or indirectly on a substrate and pressing the forming die onto the resin layer so as to form the concavoconvex pattern on the resin layer, a forming process of bar-like polarizing members for forming the bar-like polarizing members in the layout pattern using the concavoconvex pattern of the resin layer, and a forming process of a polarizing matrix layer for forming the light-transmittable polarizing matrix layer so as to bury the formed bar-like polarizing members. Accordingly, the polarizing plate of the resonance absorption effect type can be obtained, which is low in price, massproducible, high in extinction ratio, high in performance and high in reliability.

What is claimed is:

1. A method of manufacturing a polarizing plate of a resonance absorption effect type in which plural bar-like polarizing members are arranged in a light-transmittable polarizing matrix layer with major axes thereof orienting in a constant direction, said method comprising:

(1) preparing a forming die having a concavoconvex pattern corresponding to a layout pattern of the bar-like polarizing members;

(2) forming a resin layer directly or indirectly on a substrate and pressing the forming die onto the resin layer so as to form the concavoconvex pattern on the resin layer;

(3) forming the bar-like polarizing members in said layout pattern using the concavoconvex pattern of the resin layer; and (4) forming the light-transmittable polarizing matrix layer so as to bury the formed bar-like polarizing members, wherein a length of the major axis of each of said bar-like polarizing members is set to no greater than a wavelength of an incident light upon the polarizing plate, and wherein an aspect ratio of the bar-like polarizing member is set from 1.5:1 to 40:1 .

2. The method according to claim 1, wherein, the step (2) forms said resin layer directly on the substrate, and wherein the step (3) comprises etching the resin layer according to the concavoconvex pattern of the resin layer to expose the substrate, then depositing the bar-like polarizing members on said exposed substrate, and then removing the remaining resin layer.

3. The method according to claim 1, wherein the step (2) comprises interposing a conductive material for forming the bar-like polarizing members between the substrate and the resin layer, and wherein, the step (3) comprises etching the resin layer and the conductive material according to the concavoconvex pattern of the resin layer, and then removing the remaining resin layer.

4. The method according to claim 1, wherein the step (2) comprises softening the resin layer prior to pressing the forming die onto the resin layer.

5. The method according to claim 1, wherein each of said bar-like polarizing members includes silver.

6. A method of manufacturing a polarizing plate of a resonance absorption effect type in which plural bar-like polarizing members are arranged in a light-transmittable polarizing matrix layer with major axes thereof orienting in a constant direction, said method comprising:

(1) preparing a forming die having a concavoconvex pattern corresponding to a layout pattern of the bar-like polarizing members;

(2) forming a resin layer directly or indirectly on a substrate and pressing the forming die onto the resin layer so as to form the concavoconvex pattern on the resin layer;

(3) forming the bar-like polarizing members in said layout pattern using the concavoconvex pattern of the resin layer; and (4) forming the light-transmittable polarizing matrix layer so as to bury the formed bar-like polarizing members, wherein said steps (2) to (4) are repeated using said formed polarizing matrix layer as the substrate so as to stack the polarizing matrix layers each including the bar-like polarizing members, wherein a length of the major axis of each of said bar-like polarizing members is set to no greater than a wavelength of an incident light upon the polarizing plate, and wherein an aspect ratio of the bar-like polarizing member is set from 1.5:1 to 40:1.

7. The method according to claim 6, wherein said step (2) comprises forming said resin layer directly on the substrate, and wherein said step (3) comprises etching the resin layer according to the concavoconvex pattern of the resin layer to expose the substrate, then depositing the bar-like polarizing members on said exposed substrate, and then removing the remaining resin layer.

8. The method according to claim 6, wherein said step (2) comprises interposing a conductive material for forming the bar-like polarizing members between the substrate and the resin layer, and wherein said step (3) comprises etching the resin layer and the conductive material according to the concavoconvex pattern of the resin layer, and then removing the remaining resin layer.

9. The method according to claim 6, wherein said step (2) comprises softening the resin layer prior to pressing the forming die onto the resin layer.

10. The method according to claim 6, wherein each of said bar-like polarizing members includes of silver.

* * * * *